United States Patent
Karakawa

(10) Patent No.: US 8,730,306 B2
(45) Date of Patent: May 20, 2014

(54) 3-D PROJECTION FULL COLOR MULTIMEDIA DISPLAY

(75) Inventor: Masayuki Karakawa, Newmarket, NH (US)

(73) Assignee: Corporation for Laser Optics Research, Portsmouth, NH (US)

( * ) Notice: Subject to any disclaimer, the term of this patent is extended or adjusted under 35 U.S.C. 154(b) by 1709 days.

(21) Appl. No.: 11/789,397

(22) Filed: Apr. 24, 2007

(65) Prior Publication Data

US 2007/0247709 A1    Oct. 25, 2007

Related U.S. Application Data

(60) Provisional application No. 60/794,669, filed on Apr. 25, 2006.

(51) Int. Cl.
*H04N 15/00* (2006.01)
*H04N 13/04* (2006.01)

(52) U.S. Cl.
USPC ............ 348/51; 353/7; 353/31; 356/317; 356/319; 362/10; 362/19

(58) Field of Classification Search
USPC .......... 345/427; 348/51; 353/8, 31, 94, 7; 356/317, 416; 359/468, 15; 600/310; 349/5; 382/199; 362/610
See application file for complete search history.

(56) References Cited

U.S. PATENT DOCUMENTS

| | | | |
|---|---|---|---|
| 5,348,002 A * | 9/1994 | Caro | 600/310 |
| 6,283,597 B1 | 9/2001 | Jorke et al. | |
| 6,377,370 B1 * | 4/2002 | Taketomi et al. | 359/15 |
| 6,867,775 B2 * | 3/2005 | Buck et al. | 345/427 |
| 7,344,291 B2 * | 3/2008 | Hatanaka et al. | 362/610 |
| 7,422,330 B2 * | 9/2008 | Magarill | 353/31 |
| 7,426,026 B2 * | 9/2008 | Matsumoto et al. | 356/317 |
| 7,562,988 B2 * | 7/2009 | Kasazumi et al. | 353/94 |
| 7,671,992 B2 * | 3/2010 | Ehbets et al. | 356/416 |
| 7,926,949 B1 * | 4/2011 | Boothroyd | 353/8 |
| 2004/0165150 A1 | 8/2004 | Jorke | |
| 2005/0225630 A1 * | 10/2005 | Childers et al. | 348/51 |
| 2006/0177137 A1 * | 8/2006 | Friedhoff | 382/199 |
| 2007/0146880 A1 * | 6/2007 | Bleha et al. | 359/468 |
| 2007/0236617 A1 * | 10/2007 | Lippey | 349/5 |

FOREIGN PATENT DOCUMENTS

WO    WO-2004/038457    5/2004

* cited by examiner

*Primary Examiner* — Dustin Nguyen
(74) *Attorney, Agent, or Firm* — Foley & Lardner LLP; Edward A. Gordon

(57) ABSTRACT

Methods and systems are described herein which produce polarization-independent full color images suitable for rear-projection television sets and other multimedia displays. The system uses illumination with R, G, B light from two different light sources for each color. A viewer wears glasses with narrowband optical filters, preferably holographic filters. The R, G, B light from the light sources is slightly offset at each of the 3 emission wavelengths, with one set of R, G, B light being filtered by the holographic filter in front of the left eye of the, and the other set of R, G, B light being filtered by the holographic filter in front of the viewer's right eye.

34 Claims, 6 Drawing Sheets

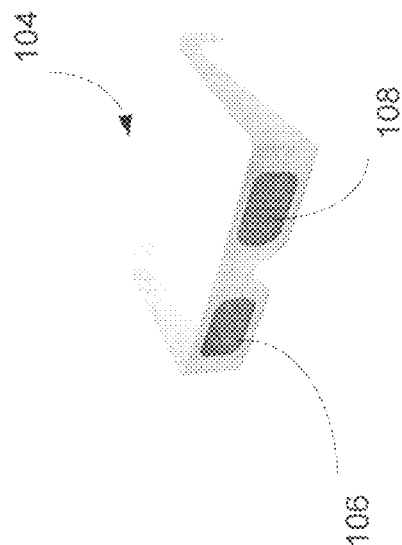
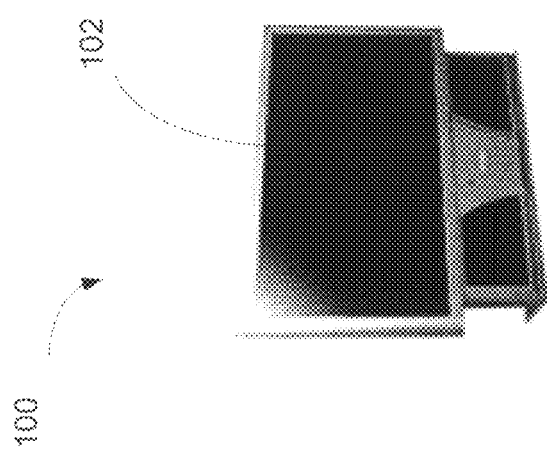
Figure 1

3-D PROJECTION FULL COLOR MULTIMEDIA DISPLAY

CROSS-REFERENCE TO RELATED APPLICATION

This application claims the benefit of U.S. Provisional Application Ser. No. 60/794,669, filed Apr. 25, 2006, the entire contents of which are incorporated herein by reference.

BACKGROUND OF THE INVENTION

Various techniques have been used in the past to produce stereoscopic (three-dimensional) images for motion pictures or television. In general, these techniques involve two camera systems in which two different pictures are taken from slightly different camera angles and locations. The object is to simulate the manner in which depth is perceived by a pair of human eyes, which are themselves slightly offset from each other and thus view images at slightly different angles. The two camera images are superimposed and presented to the viewer simultaneously on a television or movie screen. The images are then separated in some fashion for the viewer so that one eye sees only one image, and the other eye sees only the other image.

One technique which has been used to implement this approach is called the anaglyphic 3-D process, and has been employed in earlier 3-D motion pictures. This technique uses color filters to separate the two images. The images are color coded, for example with red and blue/green, respectively, and the viewer is provided with glasses having different colored filters in front of each eye. Each filter rejects the image that is not intended for that eye, and transmits the image which is intended to be seen by that eye. A red color filter will pass only the red image, while a blue/green color filter will pass only the blue/green image. If the left eye image is presented as a red image and the right as a blue/green image, and a blue/green filter is placed in front of the right eye and a red filter in front of the left eye, the proper images will be directed to the proper eye and a 3-D image will be perceived by the viewer.

The anaglyphic 3-D process is advantageously inexpensive to implement and can be used with any type of screen or display medium, as long as the colors can be effectively separated. Typically, two projectors are required, one for the red image, and another for the blue/green image. However, color filters which fully reject the undesired image are difficult to make, with the result that the 3-D effect is impaired. A significant disadvantage therefore remains in that the image is essentially interpreted in the brain as a black and white image or is only capable of producing drab colors at best, which is unappealing to the typical consumer. The images are generally of poor quality with perceptible shadowing, and may cause discomfort to the viewer, such as eye fatigue and/or nausea.

Another 3-D process used in motion pictures uses polarized light, in which the left and right eye images are separated by the use of polarizing light filters or other polarizing elements known in the art. The left eye image is projected onto the screen through a polarizing filter rotated by, for example, 45° to the left of vertical, while the right eye image is projected onto the screen through a polarizing filter rotated 45° to the right of vertical. In this way the polarization of the two images are at right angles, and similarly polarized filters placed in front of each of the viewer's eyes will cause the proper image to be transmitted to each eye. This method produces high-quality images, but disadvantageously also requires two projectors, goggles with high-quality polarizing filters for viewing, and a special polarization-maintaining projection screen. Moreover, the 3-D image will wash out if the viewer tilts his/her head too much or moves around too far.

Another technique which has been used to produce 3-D images of motion pictures involves the sequential presentation of left and right eye images to the viewer, wherein the alternate left and right eye images are projected so that the polarization of the two images is at right angles, at described above. To be perceived by the viewer as a continuous motion, each of the left and right eye images would need to be projected at twice the conventional frame rate of 24 frames/second. A single projector, for example, a digital light processing system (DLP) from Texas Instruments, capable of projecting 48 frames/second could be used to project the image with alternating polarization.

Another approach uses a field sequential technique. This is accomplished by means of sequentially recording the left and the right scenes (fields) and then sequentially displaying them in the same order with proper synchronization. Each viewer would be provided with synchronized electro-optical glasses to switch on the filter in front of each eye when its image is being presented. This process is complicated and expensive, and requires special equipment for broadcasting the trigger signals to the electro-optical glasses worn by each user.

It therefore becomes evident, that a full color 3-D television and/or multimedia display that can be viewed with relatively inexpensive glasses/goggles has mostly included generation of polarized images intended for the left and right eye by a projection method. Conventional methods to date have required a polarization-maintaining projection screen. However, the conventional methods cannot be used with, for example, rear-projection television (RPTV) sets, because the polarization becomes completely random when the image passes through the screen of the RPTV and as a result, the 3-D effect gets lost.

Accordingly, a new approach is required for displaying 3-D color television images with RPTV sets that do not rely on polarization effects to separate the images for the left and right eye.

SUMMARY OF THE INVENTION

In aspect, the invention relates a method of displaying a three-dimensional image. The method includes displaying a first series of images intended to be viewed by the right eye of a viewer. These right eye images are displayed by illuminating a light modulator with a first color. A first series of images intended to be viewed by the left eye of a viewer are also displayed. Each image in the series of left eye images corresponds to an images in the series of right eye images. The first series of left eye images are displayed by illuminating the light modulator with a second color. The second color is substantially the same as, but not identical to the first color. A viewer is provided with a filter for filtering out the first color and a filter for filtering out the second color.

In one implementation, the method includes displaying a second series of left eye images and a second series of right eye images. Each image in the second series of left eye images and right eye images correspond to respective images in the first series of left eye images and right eye images. The second series of left eye images and second series of right eye images are displayed by illuminating the light modulator with a third and a fourth color, respectively. The third and fourth colors are substantially the same, but they are not identical. They are also substantially different from the first and second colors. In one embodiment, the first and second colors correspond to a first primary color and the third and fourth colors correspond to a second primary color. The left eye filter filters out the third color and the right eye filter filters out the fourth color.

In one implementation, the same light modulator is used to modulate all the images. In another implementation, one light modulator is used to modulate the first and second colors and a different light modulator is used to modulate the third and fourth colors. In still another implementation, a separate modulator is employed to modulate each color. In various embodiments, the light modulators are illuminated by a laser, a laser array, a light emitting diode, or a lamp having an associated color wheel.

The first and second colors, in one embodiment, are both perceived by a user either red, green, blue, magenta, cyan, or yellow. The third and fourth colors are both perceived by a user as a different primary color. The colors have a bandwidth with a center wavelength. Preferably, the center wavelengths of the first and second colors differ by about 10 nm. In one implementation, the bandwidths of the first and second color do not overlap.

According to another aspect, the invention relates to a system for displaying a three-dimensional image. The system includes a first light source providing a first illumination color and a second light source providing a second illumination color. The second illumination color is substantially the same as, but not identical to the first illumination color. The system also includes a light modulator, for example, an array of micromirrors or a liquid crystal on silicon array, for modulating light emitted by the first and second light sources to generate two series of images. The system also includes a processor for alternatingly addressing the light modulator with images from the first and second series of images. Images in a second series correspond to respect images in the first series. In addition, the system includes projection optics for displaying the two series of images on a display screen.

In various embodiments, the first and second light sources include lasers, arrays of lasers, light emitting diodes, and a lamp with corresponding filters included on a color wheel. In embodiments in which each light source includes an array of lasers, the light source also includes optics for combining the light output by the array of lasers to form the first illumination color. In one embodiment, the light in the first illumination color is centered at a wavelength that is 10 nm apart from a center wavelength of the light included in the second illumination color. In one embodiment, the system include third and fourth light sources emitting substantially similar, but not identical, colors of light. The colors emitted by the third and fourth light sources is substantially different than the colors emitted by the first and second light sources.

The system includes viewing glasses that include a left eye filter and a right eye filter. The left eye filter filters out the first series of images and the right eye filter filters out the second series of images. The left eye and right eye filters each include a plurality of notch filters, preferably thin-film holographic notch filters, tuned to block the wavelengths of light emitted by the first and third and second and fourth light sources, respectively.

BRIEF DESCRIPTION OF THE DRAWINGS

In the detailed description which follows, reference will be made to the attached drawings, in which:

FIG. 1 is a system diagram for presenting 3-D images using a rear-projection television, according to an illustrative embodiment of the invention.

DETAILED DESCRIPTION OF CERTAIN ILLUSTRATIVE EMBODIMENTS

Figure 2:
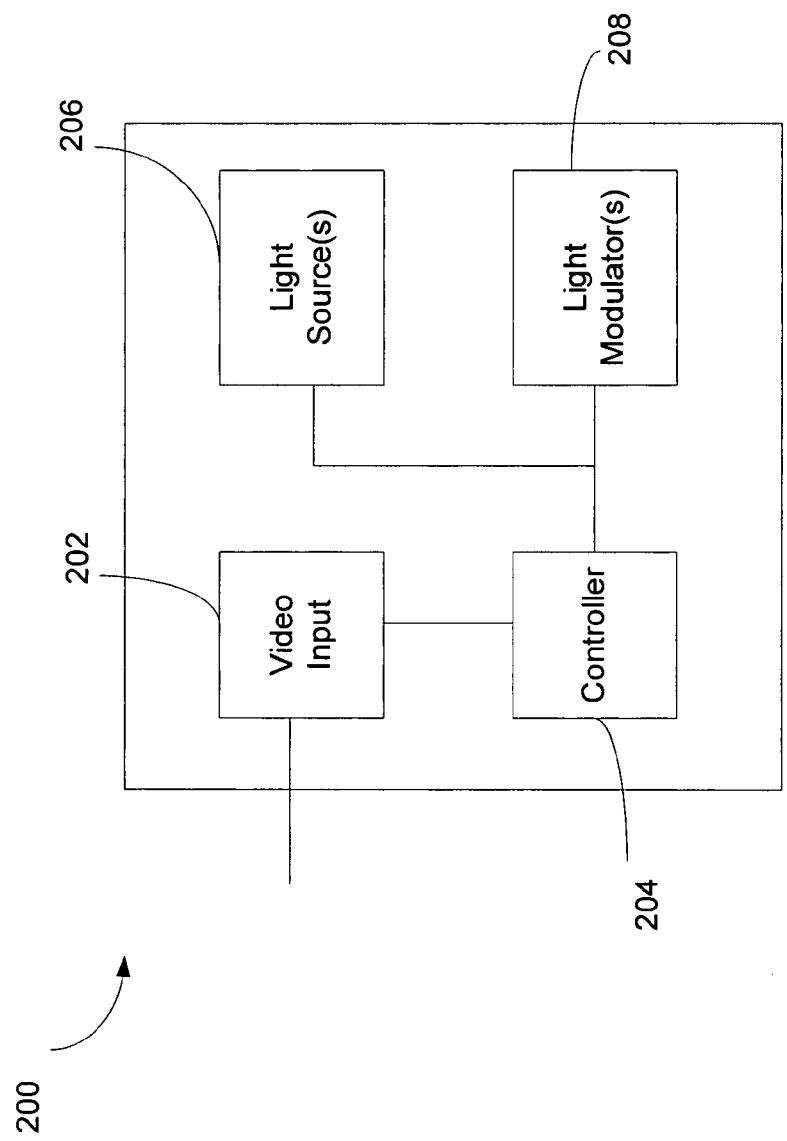
FIG. 2 is a block diagram of the rear-projection television of FIG. 1, according to an illustrative embodiment of the invention.

To provide an overall understanding of the invention, certain illustrative embodiments will now be described, including various apparatus and methods for forming three-dimensional images. However, it will be understood by one of ordinary skill in the art that the apparatus and methods described herein may be adapted and modified as is appropriate for the application being addressed and that the systems and methods described herein may be employed in other suitable applications, and that such other additions and modifications will not depart from the scope hereof.

Systems and methods are described that can be used to produce a full-color projection image on a non-polarization maintaining screen, such as a RPTV. The systems and methods are based on the concept that almost any point in color space is accessible by a combination of three distinct colors, red (R), green (G), and blue (B). An additive color system involves light emitted directly from a source or illuminant of some sort. The additive reproduction process usually uses red, green and blue light to produce the other colors. Combining all three primary lights colors in equal intensities produces white. Varying the luminosity of each light color eventually reveals the full gamut of those three lights colors.

Alternative color spaces can be generated using combinations of other primary colors. One commonly used color space includes using combinations of cyan, magenta, and yellow. While throughout this application, reference will be made to the RGB color space, the principles can likewise be applied to other color spaces known in the art.

It should be noted that additive color is a result of the way the eye detects color, and is not a property of light. There is a vast difference between yellow light, with a wavelength of approximately 580 nm, and a mixture of red and green light. However, both stimulate the eyes in a similar manner, so no difference is perceived by the viewer.

Perception of color is achieved in mammals through color receptors (known as cone cells) containing pigments with different spectral sensitivities (trichromats). In the human eye, the cones are maximally receptive to short, medium, and long wavelengths of light and are therefore usually called S-, M-, and L-cones. L-cones are often referred to as the red receptor, but while the perception of red depends on this receptor, micro-spectrophotometry has shown that its peak sensitivity is in the yellow region of the spectrum.

A particular frequency of light stimulates each of these receptor types to varying degrees. Yellow light, for example, stimulates L-cones strongly and M-cones to a moderate extent, but only stimulates S-cones weakly. Red light, on the other hand, stimulates almost exclusively L-cones, and blue light almost exclusively S-cones. The visual system combines the information from each type of receptor to give rise to different perceptions of different wavelengths of light.

TABLE 1

| Cone type | Name | Range | Peak sensitivity |
|---|---|---|---|
| S | β (Blue) | 400 ... 500 nm | 440 nm |
| M | γ (Green) | 450 ... 630 nm | 544 nm |
| L | ρ (Red) | 500 ... 700 nm | 580 nm |

As seen from the Table, the responses from the cones types overlap and are quite broad. Although the peak response of the S-cones is at 440 nm, the eye will barely recognize a chroma difference between light emitted at, for example, 455 nm and light emitted at 465 nm. Moreover, within certain limits, an almost identical perceived color can be produced by a different admixture of slightly different, but separable wavelengths.

FIG. 1 is diagram of a 3-D display system 100 including a rear-projection television (RPTV) 102 and a pair of glasses 104 for wearing by a viewer of the RPTV 102. The 3-D display system 100 operates using an approach where left eye and right eye digital images are produced by the RPTV by illuminating, for example, 2-D micro-display panels alternatingly with images formed using two separate color spaces, e.g., $R_1$, $G_1$, $B_1$ and $R_2$, $G_2$, $B_2$. In one embodiment, $R_1$ may be selected to cover a wavelength range between 600-610 nm; $G_1$ to cover a wavelength range between 520-540 nm; and $B_1$ to cover a wavelength range between 440-460 nm. $R_1$, $G_1$, $B_1$ would be directed, for example, to the right eye. Likewise, $R_2$ may be selected to cover a wavelength range between 610-640 nm; $G_2$ to cover a wavelength range between 540-550 nm; and $B_2$ to cover a wavelength range between 460-490 nm. $R_2$, $G_2$, $B_2$ would then be directed to the left eye.

The glasses 104 worn by the viewer include a right eye filter 106 and a left eye filter 108. The right eye filter 106 includes a thin-film notch filter for each primary color in the color space intended to be viewed by the left eye, for example $R_2$, $G_2$, $B_2$. The left eye filter, similarly, includes a thin-film notch filter for each primary color in the color space intended to be viewed by the right eye, for example, $R_1$, $G_1$, $B_1$. Thus, the left eye of the viewer is not able to perceive images formed using the $R_1$, $G_1$, $B_1$ color space, and the right eye of the viewer is not able to perceive images formed using the $R_2$, $G_2$, $B_2$ color space.

In an alternative embodiment, in addition to, or instead of including notch filters, the left eye filter and the right eye filter in the glasses include thin-film band-pass filters targeted to the primary colors of their respective color spaces. Holographic laser bandpass filters are fabricated by recording interference patterns formed between two mutually coherent laser beams, unlike conventional interference filters, which are made by vacuum evaporation techniques. The transmission of holographic filters can reach >90% of S-polarized laser light with a spectral bandwidth of <2 nm.

FIG. 2 is a block diagram of electronic components of an RPTV 200, according to an illustrative embodiment of the invention. The RPTV 200 includes a video input 202, a controller 204, one or more light sources 206, and one or more light modulators 208. The video input 202 receives an image signal encoding a series of left eye image frames and a series of right eye image frames for display to a viewer. In various embodiments, either the video input 202 or the controller 204 decomposes each right eye image frame and each left eye image frame into at least one primary color subframe for each primary color used to display the respective image frames. For example, in one implementation, each right eye image frame is split into a sufficient number of primary color subframes to provide 8 to 10 bits of grayscale depth per primary color.

The controller 204, in one embodiment is an application specific integrated circuit. In alternative embodiments, the controller can be a general purpose processor, a field programmable gate array, or other integrated circuit. The controller 204 controls the light sources 206 and the light modulators 208 to display the left eye and right eye image frames encoded in the image signal.

Figure 3:
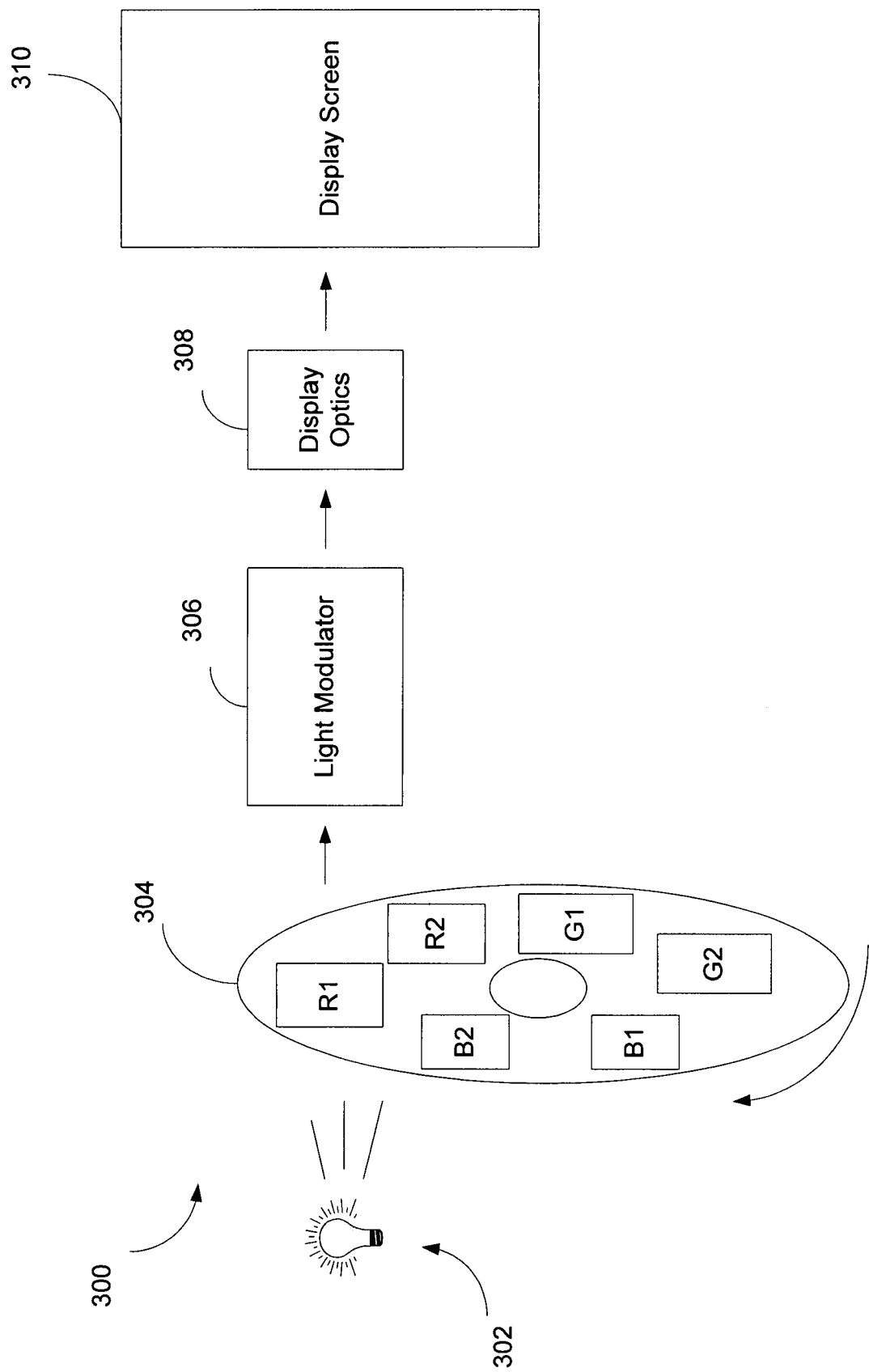
FIG. 3 is a block diagram of an optical pathway in the rear-projection television of FIG. 1, according to an illustrative embodiment of the invention.

FIG. 3 is a block diagram of the optical pathway in an illustrative RPTV 300, according to one embodiment of the invention. Referring to FIGS. 2 and 3, in the RPTV 300, the light source 206 includes a single broad spectrum lamp 302 and a color wheel 304. The color wheel 304 includes a series of filters corresponding to respective primary colors (e.g., $R_1$, $R_2$, $G_1$, $G_2$, $B_1$, and $B_2$) in the color spaces used to display the left eye images and the right eye images. In one embodiment, the color wheel 304 includes one filter for each respective primary color. In alternative embodiments, the color wheel includes multiple filters for each respective primary color. In such an embodiment, each filter for a given color may be of a different size so that the system may implement a pulse width modulation gray scale scheme.

In operation, the color wheel 304 rotates at a rate such that each filter comes into the optical path light emitted from the lamp 302 once for each right eye image and once for each left eye image received by the RPTV 300 prior to the display of any images related to a subsequent frame. The overall frame rate is preferably at least 30 Hz, and may equal to or greater than 60 Hz. Thus, if the RPTV 300 were to operate with, for example, a 60 Hz frame rate and 4 bits of grayscale depth per primary color, the controller would have to load 24 distinct primary color subframes (4 primary color subframes for each of three primary colors for a right eye image frame and 4 primary color subframes for each of three primary colors for a left eye image frame) into the light modulator in ⅙₀th of a second. In one embodiment, the array of light modulators includes an array of MEMS mirrors. For example, the array of light modulators can be a DLP chip developed by Texas Instruments. Alternatively, the array of light modulators can be a liquid crystal on silicon (LCoS) light modulator array. Display optics 308 project light reflecting off the light modulator on to a display screen 310 for a viewer to see.

Figure 4:
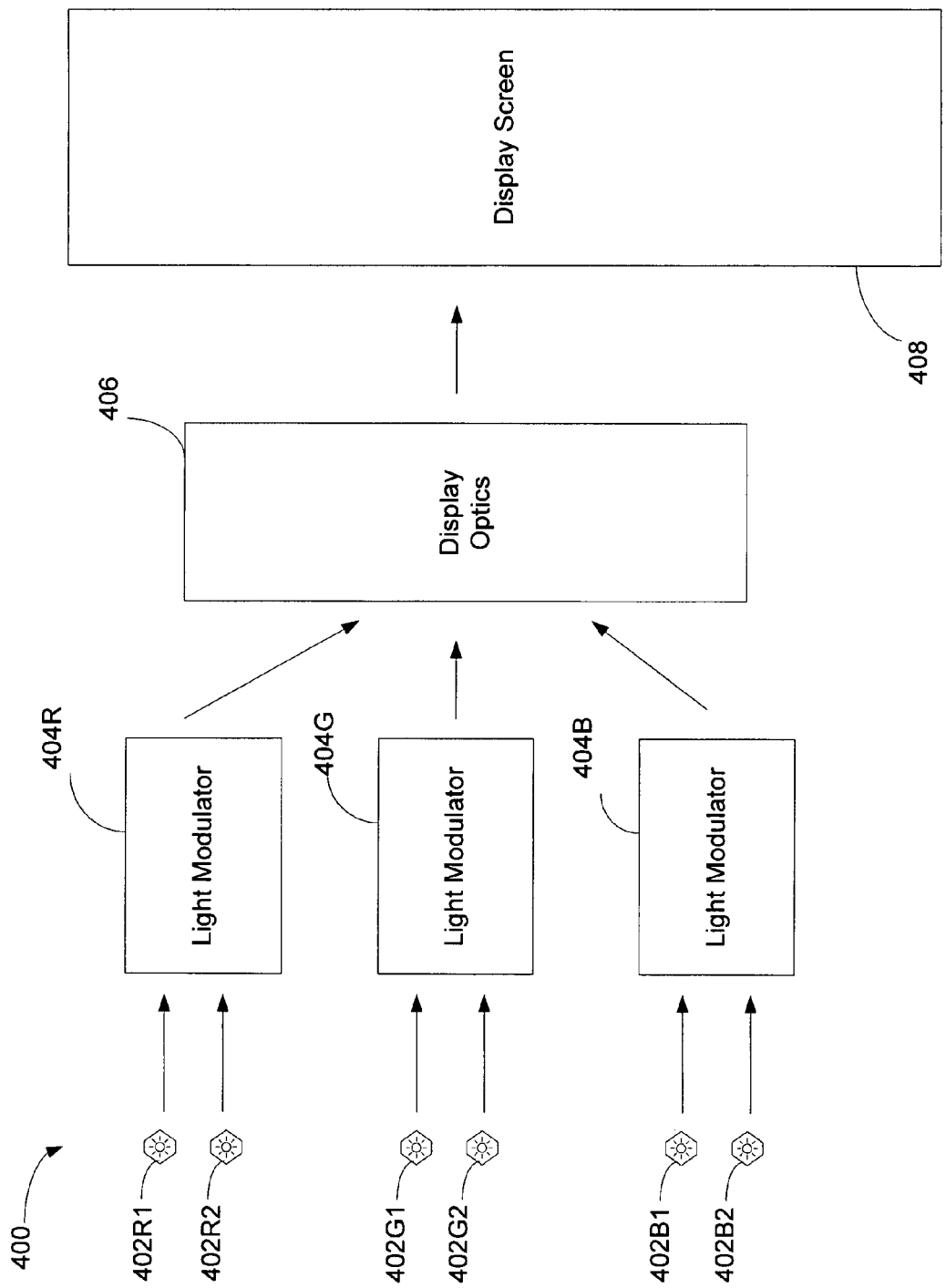
FIG. 4 is a block diagram of an optical pathway in the rear-projection television of FIG. 1, according to a second illustrative embodiment of the invention.

FIG. 4 is a block diagram of an optical path of alternative implementation of an RPTV, according to an illustrative embodiment of the invention. The RPTV 400 includes six light sources 402. The RPTV includes one light source 402 for each primary color used to form images. For example, one light source 402R1 emits a light having a wavelength corresponding to a first red color, R1. A second light source 402R2 source emits a light having a wavelength corresponding to a second red color, R2. A third light source 402G1 source emits a light having a wavelength corresponding to a first green color, G1. A fourth light source 402G2 emits a light having a wavelength corresponding to a second green color, G2. A fifth light source 402B1 source emits a light having a wavelength corresponding to a first blue color, B1. A sixth light source 402B2 emits a light having a wavelength corresponding to a second blue color, B2.

The display includes one light modulator (either LCoS or DLP) for each pair of light sources 402. That is, the display includes a light modulator 404R for modulating light emitted by both red light sources 402R1 and 402R2, a light modulator 404G for modulating light emitted by both green light sources 402G1 and 402G2, and a third light modulator 404B for modulating light emitted by both blue light sources 402B1 and 402B2. Display optics 406 redirect the light modulated by the light modulators 404R, 404G, and 404B towards a display screen 408. By having three times the light modulators than the RPTV 300, the RPTV 400 can display three times as many primary color subframes per primary color in the time allowed for a given image frame, allowing for greater gray scale depth. In operation, the controller alternately loads right eye image primary subframes and left image primary subframes into the respective light modulators 404R, 404G, and 404B. In an alternate implementation, the RPTV 400 includes a separate light modulator for each light source.

The RPTV 400 has the further advantage over the RPTV 300 in that separation between the left and right images can be significantly improved by using high brightness, narrow bandwidth light sources in the red, green and blue spectral range. Suitable light sources include lasers, in particular semiconductor diode lasers which directly convert electric current into photons, and/or optically pumped solid state lasers, and/or non-linear optical elements for frequency-upconversion and/or frequency-mixing. Red, green and blue (RGB) lasers offer demonstrable benefits over incandescent light sources for high-performance imaging applications. Greater color saturation, contrast, sharpness, and colorgamut are among the most compelling attributes distinguishing laser displays from conventional imaging systems.

Laser sources that are capable of producing the R, G, and B wavelengths can be, for example, of three types: (1) Gas lasers (e.g., He—Ne for red and Argon for Green and blue); (2) semiconductor diode lasers that emit R, G, and B wavelengths directly; and (3) solid state lasers/oscillators that are optically pumped by semiconductor light sources and emit at one of the desired wavelengths. Gas lasers are less suitable for the intended application as their emission lines are defined by atomic transitions which are narrow (producing speckle; see below) and may not offer the desired flexibility in selecting a wavelength for the left and right images. They also have a notoriously low conversion efficiency.

A red/green/blue (RGB) semiconductor/microlaser system, consisting of three lasers or laser arrays, each operating at a fundamental color, is an efficient, high brightness, white light projection source. Semiconductor laser operation has been achieved from the UV to the IR range of the spectrum, using device structures based on InGaAlN, InGaAlP and InGaAlAs material systems. The lasing wavelengths are tunable through design of the waveguide and cavity. Desirable center wavelength ranges are 610-640 nm for red, 520-540 nm for green, and 445-470 nm for blue. Laser radiation is inherently narrow band and gives rise to the perception of fully-saturated colors.

The wavelength of semiconductor diode lasers can be adjusted within the gain curve of a semiconductor material by adjusting the composition of the material, for example, the Ga:Al:In ratio commensurate with the selection of a suitable, preferably lattice-matched substrate. Lattice-mismatch tends to shorten the operating life of lasers. The wavelength can in addition be adjusted by suitable choice of waveguide and quantum well thickness, and/or by providing wavelength-selective optical feedback by, for example, adding a DFB or DBR grating.

Unfortunately, narrow band light incident on random rough surfaces (such as a projection screen) introduces an image artifact known as "speckle." The visual effects of speckle detract from the aesthetic quality of an image and also result in a reduction of image resolution. Consequently, in the context of high resolution display systems, it is desirable that speckle be reduced or eliminated.

Preferably, the spectral bandwidth for a projection display light source, such as light sources 402R, 404G, and 404B, are on the order of several nanometers (i.e., 1-5 nm). Such a light source could be considered quasi-monochromatic, i.e., sufficiently broadband for the reduction of speckle yet sufficiently narrow band for color purity and to be discriminated by the glasses worn by the viewer.

Figure 5:
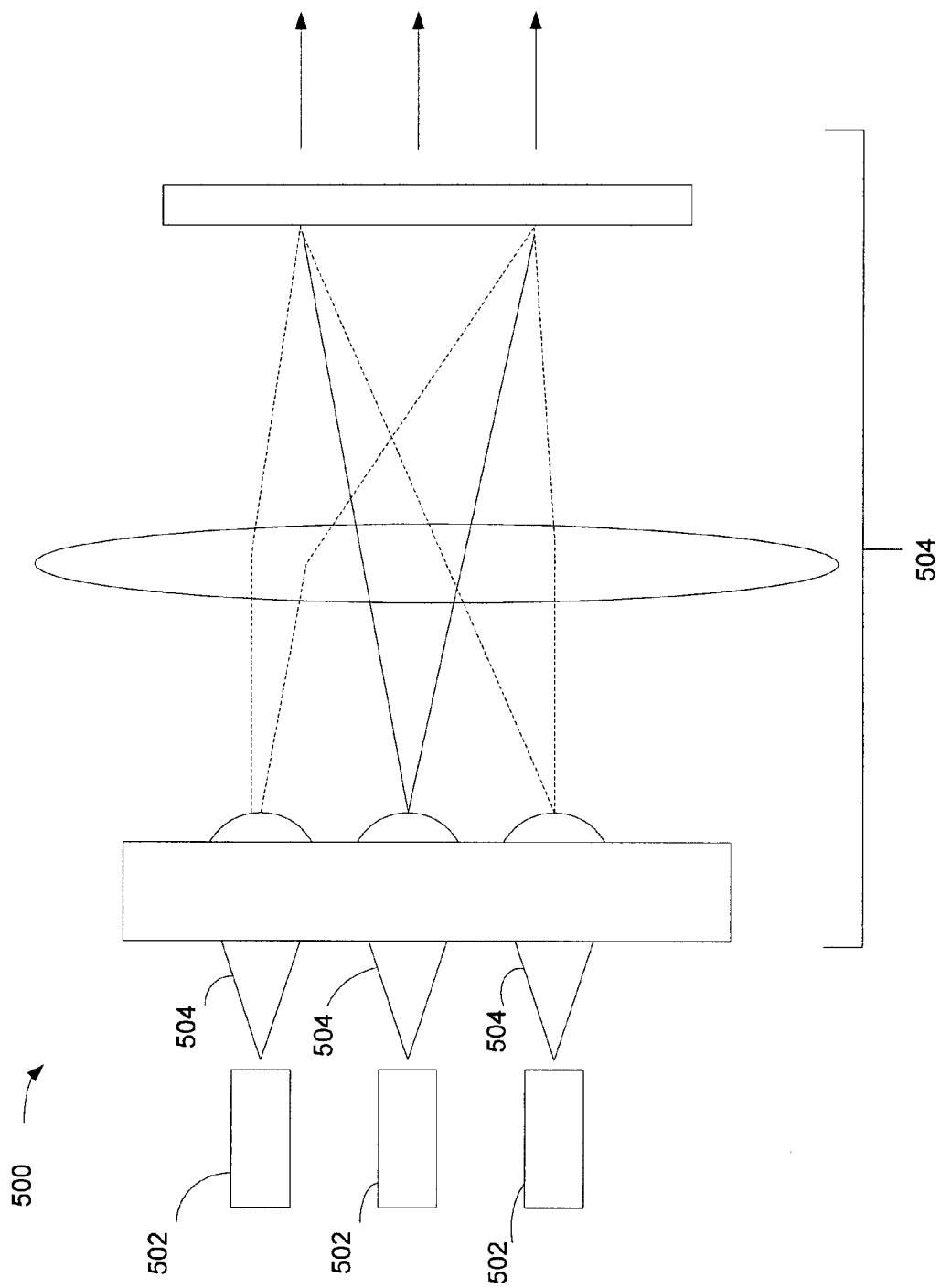
FIG. 5 is a block diagram of a system for providing a laser illumination source yielding reduced speckling, according to an illustrative embodiment of the invention.

FIG. 5 is a block diagram of one suitable light source for use in the RPTV 400. As described in U.S. Pat. No. 6,975,294 (the entirety of which is incorporated herein by reference), and as depicted in FIG. 5, a bandwidth-enhanced laser imaging system 500 includes a plurality of lasing elements 502, with each lasing element 502 emitting a laser beam with a center wavelength $\lambda_{0i}$ and a spectral bandwidth $\Delta\lambda_i$. The lasing elements 502 are allowed, by design, to have a slightly different center wavelength $\lambda_{0i}$, thereby creating an ensemble bandwidth $\Delta\Lambda$ which is greater than the bandwidth $\Delta\lambda_i$ of any individual lasing element 502 in the array.

Imaging optics 504 combine the respective laser beams 506. The lasing elements 502 can include semiconductor lasers that are arranged in a common emission plane, for example, forming a two-dimensional array. The lasing elements 502 can emit R, G, B visible light or UV or IR optical radiation.

For the third type of laser, solid state lasers/oscillators are optically pumped by semiconductor light sources, the system may also include an optical frequency converter, such as bulk crystals or waveguides that are phase matched or quasi-phase matched (QPM) and pumped by the (optionally bandwidth-enhanced) semiconductor lasing elements. Alternative light sources may also include arrays of diode-pumped solid state and fiber lasers. The ensemble spectrum $\Lambda$ can have an ensemble bandwidth $\Delta\Lambda$ between 0.5 nm and 10 nm.

Visible light emission using PP (Periodically Poled) nonlinear materials may also be suitable as light source technology for the RPTV 400. Crystals that cannot be phase-matched because of the lack of adequate birefringence to offset dispersion can be phase-matched by modulating the sign of the nonlinear coefficient. Periodically poled $LiNbO_3$, for example, can be quasi-phase-matched over the entire transparency range from less than 400 nm to greater than 4000 nm. Other suitable nonlinear crystals are, inter alia, PP KTP and PP RTA. Furthermore, the crystal orientation can be selected to optimize the nonlinear interaction. PP chips may be operated so as to generate second harmonic radiation (SHG) or sum frequency radiation (SFG).

The wavelength of GaAlInAsP lasers can be varied between orange and IR by selecting the respective Ga:Al:In and As:P ratios. Alternately, using semiconductor diode lasers in combination with PP nonlinear crystals or waveguides, red light can be efficiently produced from a suitable diode laser, such as AlGaAsP. Blue could be produced by frequency-doubling 910 nm or 930 nm laser light output from a GaInAlAs strained-layer quantum well (QW) laser, giving a wavelength of 455 nm and 465 nm, respectively. Green laser emission could be produced in two ways: (1) by frequency-doubling 1060 and 1080 nm to attain doubled wavelengths of 530 and 540 nm, respectively; and (2) by sum-frequency mixing of light from lasers emitting between 820 and 840 nm with light from lasers emitting between 1420 and 1450 nm. In the latter case, the desired wavelength can then be attained by suitable selection of one respective laser from each of the two wavelength ranges. For example, the combination of 820 nm with 1420 nm produces ~520 nm in a PP—$LiNiO_3$ crystal or waveguide, whereas the combination of 840 nm with 1450 nm produces ~540 nm. Light from multiple lasers with slightly offset wavelengths can be combined, as described above and in U.S. Pat. No. 6,975,294, to produce laser emission with ensemble spectra broad enough to suppress speckle, but narrow enough to produce the well separated emission peaks in the R, G, B spectral range for use in RPTV applications.

In another implementation, the light sources 404R, 404G, and 404B are narrow bandwidth, red, green and blue LED's instead of lasers. Because these LED's have a greater light emission bandwidth than lasers, they may not produce speckle.

Figure 6:
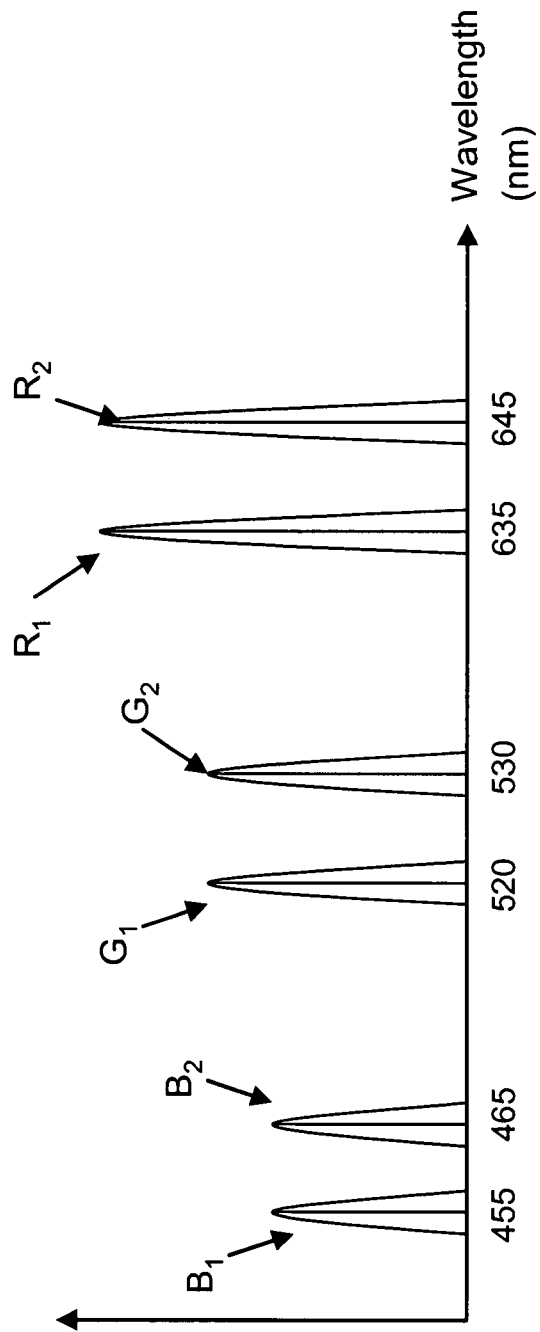
FIG. 6 is a graph illustrating wavelengths of light sources for use in an illustrative embodiment of the invention.

FIG. 6 is a graph illustrating wavelengths of light sources for use in an illustrative embodiment of the invention. As described above, the RPTV 200, 300, or 400 preferably forms images using two substantially similar, but distinguishable, wavelengths of three or more primary colors. In one illustrative embodiment or RPTV 400, the lights sources 402 emit light having a bandwidth centered at the following wavelengths:

TABLE 2

| Primary Color | Center Wavelength |
|---|---|
| R1 | 635 nm |
| R2 | 645 nm |
| G1 | 520 nm |
| G2 | 530 nm |
| B1 | 455 nm |
| B2 | 465 nm |

In summary, methods and systems are described which are able to produce polarization-independent full color images suitable for rear-projection television sets and other multimedia displays. The system uses illumination with R, G, B light from two different light sources for each color. The viewer wears glasses with narrowband optical filters, preferably holographic filters. The R, G, B light from the light sources is slightly offset at each of the 3 emission wavelengths, with one set of R, G, B light being filtered by the holographic filter in front of the left eye of the, and the other set of R, G, B light being filtered by the holographic filter in front of the viewer's right eye.

The invention may be embodied in other specific forms without departing form the spirit or essential characteristics thereof. For example, the invention described above can also be implemented with rear projection televisions employing other forms of modulators as well as with various direct view and projection displays. The forgoing embodiments are therefore to be considered in all respects illustrative, rather than limiting of the invention.

What is claimed is:

1. A method of displaying a three-dimensional image comprising:
    displaying a first series of right eye images by illuminating a light modulator with a first color, having a first center wavelength, corresponding to a first primary color, wherein the first color having the first center wavelength is emitted by at least a first laser or LED;
    displaying a first series of left eye images, wherein each image in the first series of left eye images corresponds to a respective image in the first series of right eye images, by illuminating the light modulator with a second color, wherein the second color is emitted by at least a second laser or LED, and the second color corresponds to the same primary color as the first color, wherein the second color has a center wavelength that has a second center wavelength that differs from the first center wavelength by about 10 nm; and
    providing a viewer with a left eye filter for filtering out the first color and right eye filter for filtering out the second color.

2. The method of claim 1, comprising displaying a second series of right eye images, wherein each image in the second series of right eye images corresponds to a respective image in the first series of right eye images, by illuminating a second light modulator with a third color, wherein the third color is a different primary color from the first and second colors.

3. The method of claim 2, comprising displaying a second series of left eye images, wherein each image in the second series of left eye images corresponds to a respective image in the first series of left eye images, by illuminating the second light modulator with a fourth color, wherein the fourth color is the same primary color as the third color, but has a different center wavelength than the third color.

4. The method of claim 3, wherein the first and second light modulators are the same light modulator.

5. The method of claim 3, wherein the first and second light modulators are different light modulators.

6. The method of claim 3, wherein the left eye filter filters out the third color and the right eye filter filters out the fourth color.

7. The method of claim 3, wherein the first and second colors are both perceived by the viewer as one of red, green, blue, magenta, cyan, and yellow.

8. The method of claim 7, wherein the third and fourth colors are both perceived by the viewer as a different one of red, green, blue, magenta, cyan, and yellow from the first and second colors.

9. The method of claim 1, wherein illuminating comprises activating a laser.

10. The method of claim 1, wherein illuminating comprises activating a light emitting diode.

11. The method of claim 1, wherein the first color includes light in a bandwidth that does not overlap with the bandwidth of the light included in the second color.

12. The method of claim 1, wherein the first color having the first center wavelength is emitted by a plurality of lasers, wherein the first center wavelength is the center of an ensemble bandwidth emitted by the plurality of lasers, and wherein the ensemble bandwidth is between about 0.5 nm and 10 nm.

13. A system for displaying a three-dimensional image comprising:
    a first light source providing a first illumination color corresponding to a first primary color and having a first center wavelength;
    a second light source providing a second illumination color that corresponds to the same primary color as the first illumination color, wherein the second illumination color has a center wavelength that differs from the first center wavelength by about 10 nm;
    a light modulator for modulating light emitted by the first and second light sources to generate first and second series of images, wherein each image in the first series of images corresponds to a respective image in the second series of images; and,
    wherein the first and second light sources each comprises at least one laser or light emitting diode.

14. The system of claim 13, wherein the first light source comprises a laser.

15. The system of claim 13, wherein the first light source comprises a light emitting diode.

16. The system of claim 13, wherein the first light source comprises a plurality of lasers and optics for combining the light output by the plurality of lasers to form the first illumination primary color.

17. The system of claim 16, wherein the second light source comprises a second plurality of lasers and optics for combining the light output by the second plurality of lasers to form the second illumination color.

18. The system of claim 13, wherein the light modulator comprises an array of micromirrors.

19. The system of claim 16, wherein the plurality of lasers emit light with an ensemble bandwidth of between about 0.5 nm and 10 nm and wherein the first center wavelength is the center of the ensemble bandwidth.

20. The system of claim 13, wherein the light modulator comprises a liquid crystal on silicon light modulator.

21. The system of claim 13, comprising a processor for alternately addressing the light modulator with images from the first series of images and the second series of images.

22. The system of claim 13, comprising third and fourth light sources and a second light modulator for modulating light emitted by the third and fourth light sources, wherein the third light source emits a third illumination color which is the same primary color as, but has a different center wavelength than, a fourth illumination color emitted by the fourth light source, and the third and fourth illumination colors correspond to a different primary color than the first and second illumination colors.

23. The system of claim 13, comprising viewing glasses including a left eye filter for filtering out the first series of images and a right eye filter for filtering out the second series of images.

24. The system of claim 23, wherein the left eye filter comprises a thin film notch filter.

25. The system of claim 23, wherein the left eye filter comprises a plurality of thin film notch filters.

26. The system of claim 25, wherein the right eye filter comprises a plurality of thin film notch filters.

27. The system of claim 13, comprising projection optics for displaying the first and second series of images on a display screen.

28. An apparatus for viewing three-dimensional images comprising:
a first plurality of filters for filtering out a first set of primary colors having a first set of center wavelengths emitted by a display and for allowing a second set of primary colors having a second set of center wavelengths emitted by the display to pass through the first plurality of filters;
a second plurality of filters for filtering out the second set of primary colors emitted by the display and for allowing the first set of primary colors emitted by the display to pass through the second plurality of filters; wherein each color in the first set of primary colors is the same primary color as, but has a different center wavelength than, a respective color in the second set of primary colors,
wherein the center wavelength of one primary color in the first set of primary colors differs from the center wavelength of a corresponding primary color in the second set of primary colors by about 10 nm; and
a frame for positioning the first plurality of filters in front of the left eye of a viewer and the second plurality of filters in front of the right eye of a viewer.

29. The apparatus of claim 28, wherein pairs of respective colors in the first and second sets of colors correspond to respective primary colors used to form an image.

30. A method of displaying a three-dimensional image comprising:
displaying a first series of right eye images by illuminating a light modulator with a first color corresponding to a first primary color and having a first center wavelength; and
displaying a first series of left eye images, wherein each image in the first series of left eye images corresponds to a respective image in the first series of right eye images, by illuminating the light modulator with a second color, wherein the second color is the same primary color as the first color and has a second center wavelength that differs from the first center wavelength by about 10 nm, wherein illuminating the light modulator with the first second primary color comprises illuminating an LED or a laser.

31. The method of claim 30, comprising:
displaying a second series of right eye images, wherein each image in the second series of right eye images corresponds to a respective image in the first series of right eye images, by illuminating a second light modulator with a third color, wherein the third color is a different primary color from the first and second colors, and wherein the first and second colors are both perceived by the viewer as one of red, green, blue, magenta, cyan, and yellow; and
displaying a second series of left eye images, wherein each image in the second series of left eye images corresponds to a respective image in the first series of left eye images, by illuminating the second light modulator with a fourth color, wherein the fourth color is the same primary color as the third color, but has a different center wavelength than the third color.

32. The method of claim 30, wherein illuminating comprises activating a laser.

33. The method of claim 30, wherein the first color includes light in a bandwidth that does not overlap with the bandwidth of the light included in the second color.

34. The method of claim 30, wherein the first primary color having the first center wavelength is emitted by a plurality of lasers, wherein the first center wavelength is the center of an ensemble bandwidth emitted by the plurality of lasers, and wherein the ensemble bandwidth is between about 0.5 nm and 10 nm.

* * * * *